United States Patent [19]

Ghesquiere

[11] 4,216,655
[45] Aug. 12, 1980

[54] WAVE-OPERATED POWER PLANT

[76] Inventor: Hendrik Ghesquiere, 144 Lasalle St., Baie Comeau, Canada, G4Z 1S1

[21] Appl. No.: 20,787

[22] Filed: Mar. 15, 1979

[30] Foreign Application Priority Data

Mar. 17, 1978 [GB] United Kingdom ............... 10594/78

[51] Int. Cl.$^2$ .......................... E02B 9/08; F03B 13/12
[52] U.S. Cl. ........................................ 60/398; 290/53;
405/76; 405/78; 417/330
[58] Field of Search ......................... 60/398, 413, 502;
240/42, 53; 405/76, 78, 75; 417/330, 3

[56] References Cited

U.S. PATENT DOCUMENTS

| | | | |
|---|---|---|---|
| 1,811,565 | 6/1931 | Schwabacher | 290/42 UX |
| 2,105,624 | 1/1938 | Orlove | 60/413 |
| 4,078,871 | 3/1978 | Perkins | 60/398 |
| 4,141,670 | 2/1979 | Russell | 417/330 X |

OTHER PUBLICATIONS

Popular Mechanics, Mar. 1977, p. 193, "The Russell Rectifier".
Ocean Industry, Feb. 1979, pp. 72 and 73.
Ocean Industry, Feb. 1979, p. 70, FIG. 5 Triplate Converter.

Primary Examiner—Edgar W. Geoghegan

[57] ABSTRACT

This wave-operated power plant comprises a perforated caisson breakwater in which propellers, or turbines, are mounted in the perforations or openings and drives hydraulic pumps connected thereto, which in turn drives a hydraulic motor coupled to an electric generator. One-way flap valves are mounted in the openings. Some of said flap valves allow the rushing waves to enter the caisson, while the other flap valves allow the water to flow out of the caisson.

3 Claims, 3 Drawing Figures

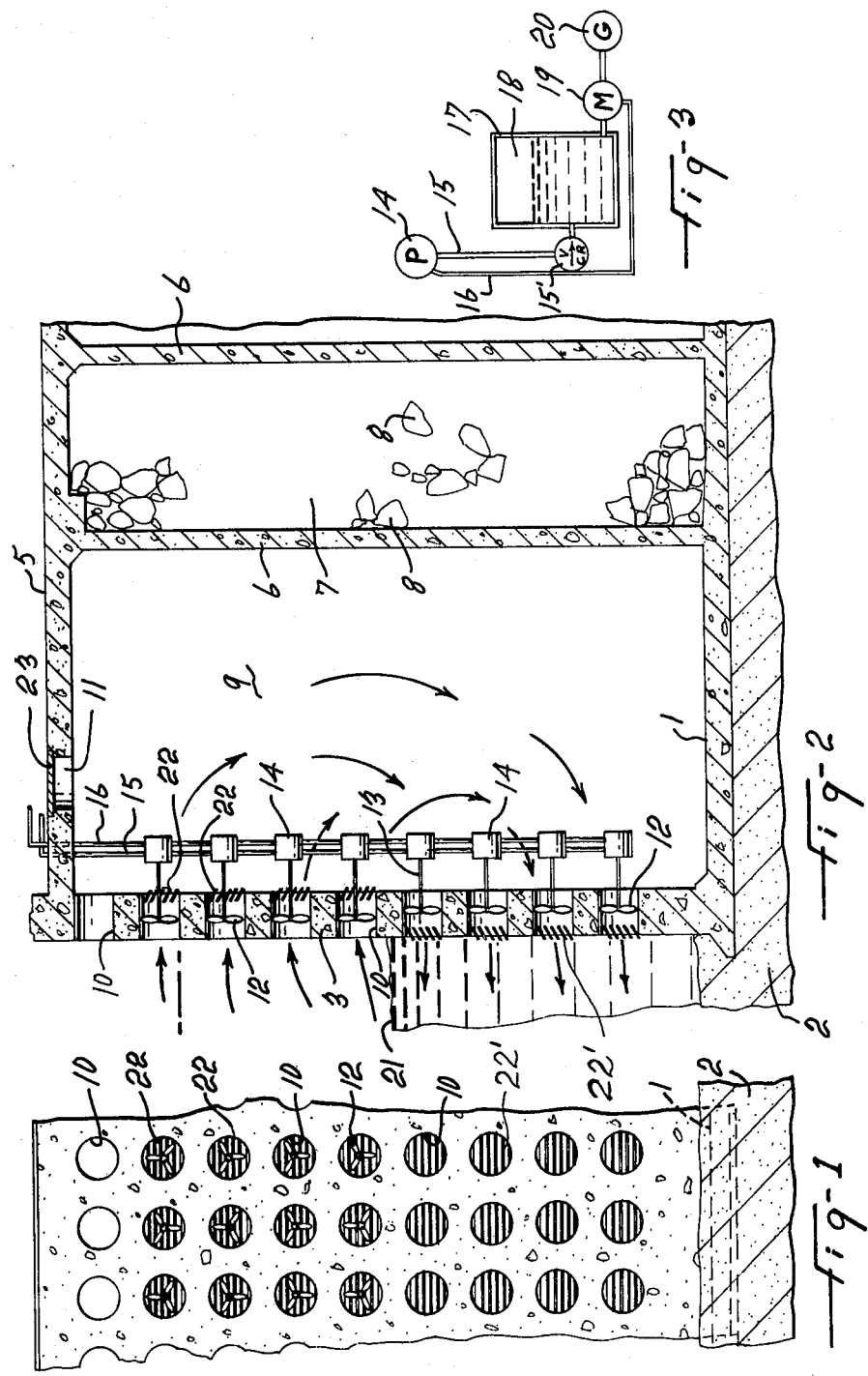

WAVE-OPERATED POWER PLANT

The present invention relates to a wave-operated power plant of the type making maximum use of the horizontal component force of the waves.

It is known to provide a caisson breakwater having a wall facing the predominant wave direction provided with a plurality of substantially uniformly distributed openings or perforations, allowing the water to rush through said openings inside the chamber defined by the caisson where the wave energy is dissipated. This type of breakwater has proven to be very efficient in eliminating the normal erosion produced at the base of the breakwater by the downwardly flowing water in a non-perforated seaward wall of the conventional breakwater.

Such a perforated caisson breakwater has been installed in 1962 at Baie Comeau, Province of Quebec, Canada.

It is the general object of the present invention to provide the above-noted breakwater structure with means to convert the wave energy into useful energy.

It is another object of the present invention to provide a caisson breakwater of the character described, in which propellers, or turbines, are mounted in the openings of the breakwater and connected to power-producing means, said propellers being driven by the water rushing through said openings.

It is another object of the invention to provide a structure of the character described, in which some of the propellers are associated with one series of one-way flap valves mounted in the openings and only allowing the rushing waves to enter the chamber of the caisson breakwater, while another series of flap valves are associated with other openings and only allow the water to flow out of the chamber.

The foregoing and other objects of the present invention will become more apparent during the following disclosure and by referring to the drawings, in which:

FIG. 1 is an elevation of part of the wall of a caisson breakwater facing the predominant wave direction;

FIG. 2 is a cross-section of the main part of the breakwater; and

FIG. 3 is a schematic representation of the power generating means.

In the drawings, like reference characters indicate like elements throughout.

A caisson type breakwater comprises a foundation 1 resting on the seabed 2, a main wall 3 facing the predominant direction of the waves and extending upwardly above the high water level, as indicated by 4, and corresponding to the crest of the highest waves occurring in the region where the breakwater is installed and from which useful energy is desired to be extracted. The breakwater caisson further includes a roof 5, partition walls 6 extending parallel to the main wall 3 between the roof 5 and the foundation 1. The breakwater includes additional chambers, as seen in cross-section. Partition walls 6 define between themselves a compartment 7 filled with rocks 8, or other ballast material. Main wall 3, together with the nearest partition wall 6, defines a wave chamber 9, which is completely hollow. Main wall 3 has a plurality of perforations or through openings 10 substantially uniformly distributed throughout the wall and establishing communication between the chamber 9 and the open body of water, or the sea.

The roof 5 is normally provided with air relief holes 11 communicating with the chamber 9. The breakwater caisson may be prefabricated on the shore and towed into place. Several caissons are longitudinally aligned to form a breakwater substantially parallel to the seashore with the main wall 3 facing the predominant wave direction. Alternately, the caissons may be aligned to form a wharf extending away from the seashore, again with the main wall 3 facing the predominant wave direction. The several caissons are preferably made of reinforced concrete. They are also preferably arranged to rest on the seabed 2. But it is also envisaged, in accordance with the invention, to arrange floating caissons which may be made of steel, or concrete, and which may be anchored in proper position.

In accordance with the present invention, the majority of the perforations 10 are provided with a propeller, or turbine 12, rotatably mounted therein and arranged for rotation under the action of the water flowing through the perforations. These turbines, or propellers, 12, are each connected to a propeller shaft 13. Each shaft 13 is coupled to a power-converting unit 14 which is preferably a hydraulic pump or could be a directly operated water-proof electric generator. The pumps 14 and propellers 12 are supported by suitable brackets, not shown, so that the propellers will be co-axial within the circular openings or perforations 10. The pumps 14 can be connected in series or in parallel by means of feed pipes 15 and return pipes 16. Feed pipes 15 are connected through check valve 15', to a suitable accumulator 17, shown in FIG. 3, wherein the fluid under pressure collected from several pumps 14 is accumulated against an air cushion 18. The liquid in the accumulator 17 serves to drive a hydraulic motor 19, in turn driving an electric generator 20. Return pipes 16 are connected to motor 19. Of course, feeding and return manifolds and common piping for several pumps would preferably be provided. A propeller 12 and accompanying power-converting unit 14 are fitted in most of the perforations 10, namely: in all perforations of any given horizontal row of perforations 10 and in all of the rows extending from well below the low water level, indicated at 21, to a maximum height corresponding to the maximum wave height which it is desired to convert into useful energy.

Each propeller 12 is associated with a one-way flap valve arrangement 22 and 22', respectively. The one-way flap valves 22 are fitted in corresponding perforations 10 and only allow water from the open body of the water flowing into the chamber 9, and not vice versa. These flap valves close automatically when the water within the chamber tries to flow back into the open sea through these perforations. The one-way flap valves 22' are mounted in other perforations 10 and only allow flowing of the water from within the chamber 9 out into the open sea. The several relief holes 11, found in the conventional perforated caisson breakwater, are preferably closed by an air-tight cover 23 firmly secured in closed position. When variations in the normal water level is not important such as in a sea with practically no tide, flaps 22 and 22' are preferably disposed as shown in the drawings with flaps 22 and 22' located above and below normal water level 21 respectively. When there is an important tide, flaps 22 and 22' can alternate in any given horizontal row of perforations 10.

The system operates as follows.

The crest of the travelling waves rushes through those openings fitted with flap valves 22 and drives the associated propellers due to the horizontal velocity component of the waves. The wave velocity is slowed down and the water level wave chamber 9 rises, compressing the air above the same when air relief holes 11 are closed. During a wave trough at the face of main wall 3, the water within the chamber, being at a higher level than the water level of the open sea, rushes back out of the chamber 9 through the lower perforations 10 fitted with the flap valves 22'. In this manner, practically the maximum amount of the energy contained in the waves is converted into useful work through the power-converting units 14, preferably hydraulic pumps. The power surges are smoothed out in the accumulator 17.

Although the outer face of the main wall 3 has been shown as being flat, it could be formed of a plurality of conical depressions co-axial with the perforations 10 forming a funnel for these perforations and with the outer edge of the funnels practically coinciding, so as to smoothly direct the unrushing water through the openings or perforations 10. Also, the propellers 12 could be multi-stage turbines so as to absorb as much energy as possible by progressively slowing down the horizontal motion of the water.

What I claim is:

1. A wave-operated power plant comprising a caisson type breakwater having an upstanding main wall erected to face the predominant wave direction and extending from below the low water level of an open water body to above the maximum height of the waves from which it is desired to extract energy, said caisson forming a substantially-closed chamber with said wall, said wall having a plurality of perforations substantially uniformly distributed throughout said wall and establishing communication between the open water body and said chamber, first propellers mounted in a first set of said perforations and driven by the waves rushing from the open water body through the perforations of said first set, water flowing into said chamber past said first propellers further spending its energy by causing a rise in the water level in said chamber, second propellers mounted in a second set of said perforations and driven by the water stored in said chamber and rushing back to said open water body, and power generating means coupled to said propellers.

2. A wave-operated power plant as claimed in claim 1, further including one-way flap valves mounted in said perforations, the flap valves associated with said first set of perforations, only allowing the rushing wave to enter said chamber and the flap valves associated with the second set of perforations, only allowing the water to flow out of said chamber into the open water body.

3. A wave-operated power plant as claimed in claim 1, or 2, wherein said power generating means includes a hydraulic pump coupled to each propeller, a hydraulic accumulator connected to each pump and a hyrdraulic motor connected to and driven by the fluid under pressure in said accumulator.

* * * * *